US007487790B2

(12) United States Patent
King et al.

(10) Patent No.: US 7,487,790 B2
(45) Date of Patent: Feb. 10, 2009

(54) UNIVERSAL DISPENSER

(75) Inventors: Joseph A. King, Wayzata, MN (US); Jeffery Johnson, Minneapolis, MN (US); Micheal Pontius, Mora, MN (US)

(73) Assignee: King Technology, Inc., Hopkins, MN (US)

( * ) Notice: Subject to any disclaimer, the term of this patent is extended or adjusted under 35 U.S.C. 154(b) by 326 days.

(21) Appl. No.: 11/406,840

(22) Filed: Apr. 18, 2006

(65) Prior Publication Data

US 2006/0254968 A1 Nov. 16, 2006

Related U.S. Application Data

(62) Division of application No. 10/635,999, filed on Aug. 7, 2003, now Pat. No. 7,059,540.

(51) Int. Cl.
*B01D 11/00* (2006.01)
*B01D 15/00* (2006.01)

(52) U.S. Cl. .................................... 137/268; 422/265

(58) Field of Classification Search ................. 137/268; 422/261, 264, 265

See application file for complete search history.

(56) References Cited

U.S. PATENT DOCUMENTS 4,763,685 A * 8/1988 King, Sr. .................... 137/268
6,676,908 B2 * 1/2004 Robinson et al. ............ 137/268

* cited by examiner

*Primary Examiner*—Kevin L Lee
(74) *Attorney, Agent, or Firm*—Jacobson & Johnson

(57) ABSTRACT

A universal cartridge that is useable in either a stagnant fluid environment or in a moving fluid environment with the universal cartridge floatable in a stagnant fluid environment and securable in a moving fluid environment with the universal cartridge having an inner housing having a diffusion port and an outer sleeve having a diffusion port with the housing and the sleeve mateable engaged with each other through frictional engagement to inhibit flow therebetween while permitting rotational displacement of the housing with respect to the sleeve to allow one to increase or decrease a dispersant transport area between a zone within the housing to a zone exterior to the housing through aligning a recessed diffusion port of the housing with a diffusion port of the sleeve with the diffusion ports inhibiting fluid flow therethrough but permitting dispersant transfer therethrough.

5 Claims, 4 Drawing Sheets

UNIVERSAL DISPENSER

CROSS REFERENCE TO RELATED APPLICATIONS

This application is a divisional application of patent application Ser. No. 10/635,999 Titled Universal Dispenser filed Aug. 7, 2003, now U.S. Pat. No. 7,059,540.

FIELD OF THE INVENTION

This invention relates generally to dispensers and, more specifically, to a universal cartridge dispenser that is usable in either a stagnant fluid environment or in a moving fluid environment to provide a predictable control of the rate of dispersant from a zone within the dispenser to a zone exterior of the dispenser.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of inline dispensers and floating dispensers for dispensing a dispersant into a body of fluid such as a body of water is known in the art. In general, two types of dispensers exist, one for use in stagnant bodies of fluids and one for use in moving fluid streams.

An example of a floating dispenser for use in stagnant fluid such as found in an open spa, a hot tub or a swimming pool is shown in King U.S. Pat. No. 4,702,270. The floating dispenser incudes an outer rotatable cylindrical housing located around a cylindrical container. To adjust the amount of dispersant released the inner housing and the outer housing are rotated with respect to one another to either increase or decrease the fluid flow area or the hole area in the side wall of the dispenser.

An example of an inline dispenser for use in dispensing materials into a moving fluid environment, such as in an inline system, is shown in U.S. Pat. No. 4,270,565. The dispenser comprises a container with openings spaced circumferentially around the bottom of the container, which is normally shielded by an outer sleeve. In operation, the container is lowered into a fluid stream to allow the fluid stream to flow directly through the container. By raising or lowering the portion of the container in contact with the fluid stream one can allow more or less of the fluid stream to flow through the container. In this type of system, one can control the release of dispersant into the inline system by controlling either the size of the fluid stream flowing through the dispenser or the velocity of the fluid stream.

In general, a user having both an inline system with a moving fluid environment and an open system with a stagnant fluid environment requires two different types of dispensers in order to controllable release the dispersant in each system. That is, one type of dispenser for the stagnant fluid environment and a second type for the inline system, which has a moving fluid environment. The present invention comprises a universal cartridge that can be adjusted to controllable release the proper amount of dispersant in either a stagnant fluid environment or a moving fluid environment.

Each of the above type of dispensing member works well when used in the proper fluid environment that it was designed for. However, it is difficult to use a dispenser, which works well in a stagnant fluid, in a moving fluid or conversely to use a dispenser, which works well in moving fluid, in a stagnant fluid and still obtain the proper dispersal rates. If one can not obtain the proper dispersal rates one can not achieve the proper concentration of the dispersant in the surrounding fluid. That is, the concentration of dispersant in the fluid may be either to high or to low. If the concentration of dispersant is a material, such as a bactericide, is to low it will not kill the bacteria in the fluid and if the concentration of the dispersant is to high it may be obnoxious or harmful. Either condition is unsatisfactory.

One of the difficulties with having a dispenser operate in either a stagnant fluid environment or in a moving fluid environment is that it appears that fluid flow conditions and, more particularly, it appears that fluid perturbations can have a substantial effect on the dispersal rate of a dispersant contained within a cartridge dispenser. Consequently, a cartridge dispenser that suitably dispenses a dispersant in a stagnant fluid environment can yield unpredictable dispersion rates when placed in a moving fluid environment even though the fluid velocity and flow rate remains the same.

Generally, the dispersant rate of a dispersant in a stagnant fluid is dependent on the difference in concentrations of the dispersant in different regions of the fluid. With a larger difference in dispersant concentrations between a dispersant in one part of the fluid and a dispersant in another part of the fluid one has a more rapid dispersant dispersal rate and with a lower difference in concentration between a dispersant in one part of the fluid and a dispersant in another part of the fluid the dispersant dispersal rate is less.

It is known that changing fluid conditions, such as changing the velocity of the fluid through a dispersant can alter the dispersant rate, i.e. the rate that a dispersant is transferred to the surrounding fluid. However, one of the problem that occurs is that if one increases the fluid velocity around a dispenser for stagnant fluids one does not always produce consistent dispensing results. That is, at one time a first velocity of fluid may produce one dispersant rate and at a later time the same fluid velocity may produce an entirely different dispersant rate. While not fully understood it is believed that fluid perturbations are present that can have a substantial effect on the dispersant dispersal rate. That is, the fluid perturbations can produce an unstable flow condition that cause the dispersant dispersal rate to fluctuate unpredictably over a wide range even though the flow rate might remain constant in the region of the dispenser.

The present invention provide a universal cartridge dispenser that allows one to maintain predictable dispersant dispersal rates in either a stagnant fluid environment or a moving fluid environment when a moving fluid is directed around the universal cartridge dispenser. In the moving fluid environment one can position the universal cartridge proximate a moving fluid stream and obtain predicable results based on the dispersant transport area between the interior of the dispenser and the exterior of the dispenser. Similarly, in a stagnant fluid environment one can position the universal cartridge in a body of fluid and obtain consistent results based on the dispersant transport area in the universal cartridge dispenser. That is, it has been found that under either a stagnant fluid environment or a moving fluid environment one can effectively control the dispersant rate of the dispersant and hence the concentration of dispersant in the surrounding fluid. By allowing one to obtain a predictable and repeatable dispersal dispersant rate it allows one to use the universal cartridge dispenser in either a stagnant fluid environment or a moving fluid environment.

The present invention provides a universal cartridge that one can predictably determine the dispersal rate whether the cartridge is in a stagnant fluid or is proximate to a moving fluid.

SUMMARY OF THE INVENTION

Briefly, the invention comprises a universal cartridge that is useable in either a stagnant fluid environment or in a moving fluid environment with the universal cartridge floatable in a stagnant fluid environment and securable in a moving fluid environment with the universal cartridge having an inner housing having a diffusion port and an outer sleeve having a diffusion port with the housing and the sleeve mateable engaged with each other through frictional engagement to inhibit flow therebetween while permitting rotational displacement of the housing with respect to the sleeve to allow one to increase or decrease a dispersant transport area between a zone within the housing to a zone exterior to the housing through aligning a recessed diffusion port of the housing with a diffusion port of the sleeve with the diffusion ports inhibiting fluid flow therethrough.

DESCRIPTION OF THE PREFERRED EMBODIMENT

Figure 1:
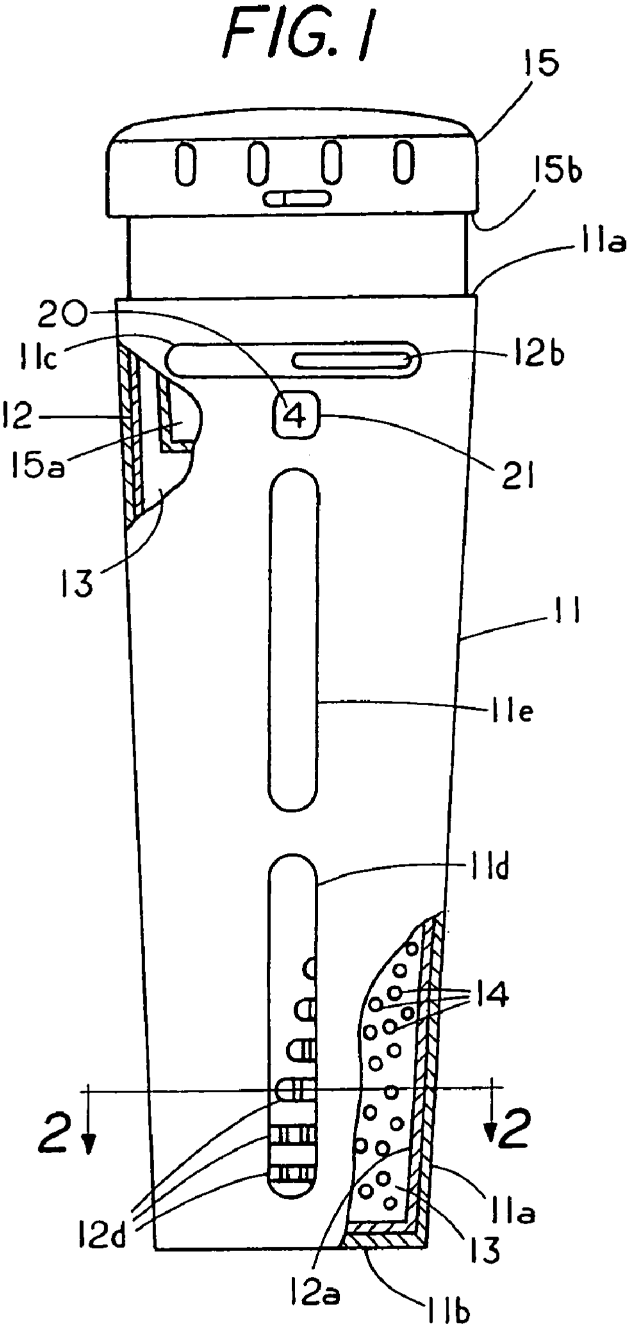
FIG. 1 is a partial sectional view of the universal cartridge.

FIG. 1 is a partial sectional view of the universal cartridge 10 of the present invention. Universal cartridge 10 comprises an outer cup-like frusto conical sleeve 11 having an open top 11*a* and a closed bottom 11*b*. Extending in a circumferential direction partially around sleeve 11 is a housing guide slot 11*c*. Extending in an axial direction and located along an axial surface element of sleeve 11 is a first elongated diffusion port 11*d* and a second elongated diffusion port 11*e*. In the embodiment shown the diffusion port 11*d* and 11*e* are shown on one side of housing 11 and a second set of identical diffusion ports are located diametrically opposite from the first set of diffusion ports. In general, housing 11 is made from a rigid material which is resistant to the fluid requiring dispensing therein. A preferred material is a polymer plastic such as Exxon Mobil PP1024 E4 which is a resin that is sold by Exxon Mobil Corporation.

Located at the top portion of cartridge 10 is a float 15 that has sufficient buoyancy to maintain at least part of the universal cartridge 10 in a submerged condition and part of the universal dispenser in an unsubmerged condition. Float 10 can comprise an air chamber 15*a* that provides buoyancy to the cartridge. If desired the chamber 15*a* can be filled with a buoyant material other than air. Float 15 allows the universal cartridge dispenser 10 to float in either a free floating or fixed position in stagnant fluid system.

Extending around the peripheral region of float 15 is a lip 15*b* for securement of the universal cartridge 10 in a fixed position in a cartridge carrier or the like. The lip enables one to secure the universal cartridge 10 in a moving fluid environment to enable dispensing of a dispersant from the universal cartridge 10 to a surrounding fluid environment.

Located within sleeve 11 is a frusto conical housing 12 having a dispersant chamber 13 therein for containing a dispersant 14 therein. Housing 12 has an outer mateable surface 12*a* that forms a frictional engagement with an inner mateable surface 11*a* of sleeve 11 (see FIG. 1*a*). A radially protrusion 12*b* having a length less than the length of the circumferential slot 11*c* allows one to partially rotate the housing 12 with respect to the sleeve 11. That is, the protrusion 12*b* limits the circumferential rotation through engagement with the ends of circumferential slot 11*c*. In addition, the protrusion 12*b* can maintain the housing 12 and sleeve 11 in axial operating condition with respect to each other since axial displacement is limited. Thus the housing 12 includes a circumferential protrusion 12*b* and the sleeve 11 includes a circumferential recess 11*c* with the circumferential protrusion 12*b* and recess 11*c* coacting to prevent an axial displacement of the housing with respect to the sleeve so as to maintain the sleeve and housing in proximate position to each other but to permit at least partial rotation of the sleeve 11 with respect to the housing 12. Housing 12 comprises a rigid material which is resistant to the fluid requiring dispensing therein. A preferred material for housing 12 is a polymer plastic.

In the embodiment shown the diffusion port 11*e* and diffusion port 11*e* in sleeve 11 extend in an axially or longitudinal direction and the housing diffusion ports 12*d* extend in lateral or a circumferential direction around housing 12. The housing 12 contains a set of reference marks 20 and the sleeve contains an opening 21 with only one of the set of reference marks visible therein so as to let a user know a dispersant setting of the universal cartridge. That is, as the sleeve 11 is rotated with respect to the housing 12 more of the circumferential diffusion ports 12*d* on housing 12 become visible through the elongated diffusion ports 11*d* and 11*e* and the reference mark 20 allows the user to know the relative rotational position of the housing with respect to the sleeve and hence the diffusion transport area from the interior or the universal dispenser cartridge to the exterior of the cartridge.

In order to maintain the housing 12 and the sleeve 11 in fixed position with respect to each other under fluid conditions the housing mateable surface 11*a* and the sleeve mateable surface 12*a* are placed in sufficient frictional engagement with each other so as to remain in a fixed rotational position with respect each other when the universal cartridge is placed in either a stagnant body of fluid or a moving fluid. However, once the universal cartridge is removed an operator can overcome the frictional resistance and rotate sleeve 11 with respect to housing 12 in order to change the transport area from within the dispenser to outside the dispenser.

A feature of the present invention is that the housing 12 has a frusto conical shape and the sleeve 11 has a frusto conical shape. Consequently, a full frictional engagement between the mateable surface 12*a* of housing 12 and mateable surface 11*a* of sleeve 11 does not occur until the sleeve 11 and housing 12 are in the axially fixed position with respect to each other as shown in FIG. 1. As a result the configuration of the housing and the sleeve allow for substantial unhindered assembly of the housing and the sleeve since a diametrical clearance between the housing and the sleeve is maintained until the sleeve and housing are almost in their axial operating position. Consequently, only during the last axial displacement of the housing with respect to the sleeve brings the sleeve 11 and housing 12 into the frictional engagement with each other, which enhances assembly of the universal cartridge.

Figure 1A:
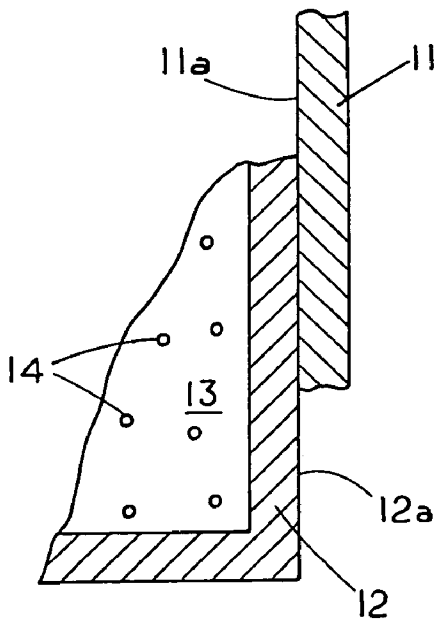
FIG. 1*a* is a partial view of the housing and sleeve of the universal cartridge of FIG. 1.

FIG. 1*a* is a cutaway view showing the housing 12 and the sleeve 11 to illustrate the interaction of mateable surface 11*a* of sleeve 11 which is in frictional engagement with mateable surface 12*a* of housing 12. In this condition the two mateable surfaces engage each other to prevent or impede flow flowing therebetween. Consequently, the access of fluid into chamber 13 is limited to the transport passage defined by the alignment of the diffusion ports in sleeve 11 and the diffusion ports in housing 12.

In order to illustrate the operation of the universal cartridge dispersant in a stagnant fluid system a sectional view taken along lines 2-2 of FIG. 1 is shown with the universal cartridge 10 surrounded by a stagnant body of fluid. By stagnant fluid it is meant fluid that has no consistent movement of fluid therepast. Examples of stagnant fluid locations would be in a hot tub or other container wherein the circulation of a fluid past the dispenser is due to random conditions rather than to a moving fluid stream.

Housing 12 has a chamber 13 therein with dispersant located in the chamber. Typically, the dispersant can be any of the halogens or minerals or the like that yield a material that provides the necessary fluid treatment. Examples of minerals include ion yielding materials that can be used to treat water in hot tubs or swimming pools to rid the water their of unwanted organisms. One particularly well suited dispersant material uses silver chloride as an ion yielding material.

In use of the universal cartridge of the present invention the zone of highest concentration of dispersant is located in chamber 13 and is designated by $Z_0$. Located external to dispenser 10 and the diffusion ports 11*d* and 12*d* is an exterior zone $Z_3$. In stagnant operation of the dispenser 10 the dispersant 10 diffuses or disperses from the zone of higher concentration $Z_0$ to the zone of lower concentration $Z_3$ as indicated by the dashed arrows. The dispersant then continues to diffuse throughout the body of fluid. In general concentration dispersion from one zone to another zone does not require a moving fluid to transport the dispersant. As a consequence the setting of the housing 12 and sleeve 11 so as to maintain a fixed transport path between the chamber 13 and the exterior of the cartridge 10 allows the dispersant contained therein to disperse from zone $Z_0$ to zone $Z_3$ at a predictable rate. Consequently, one can obtain the desired level of dispersant in the body of fluid.

Figure 2:
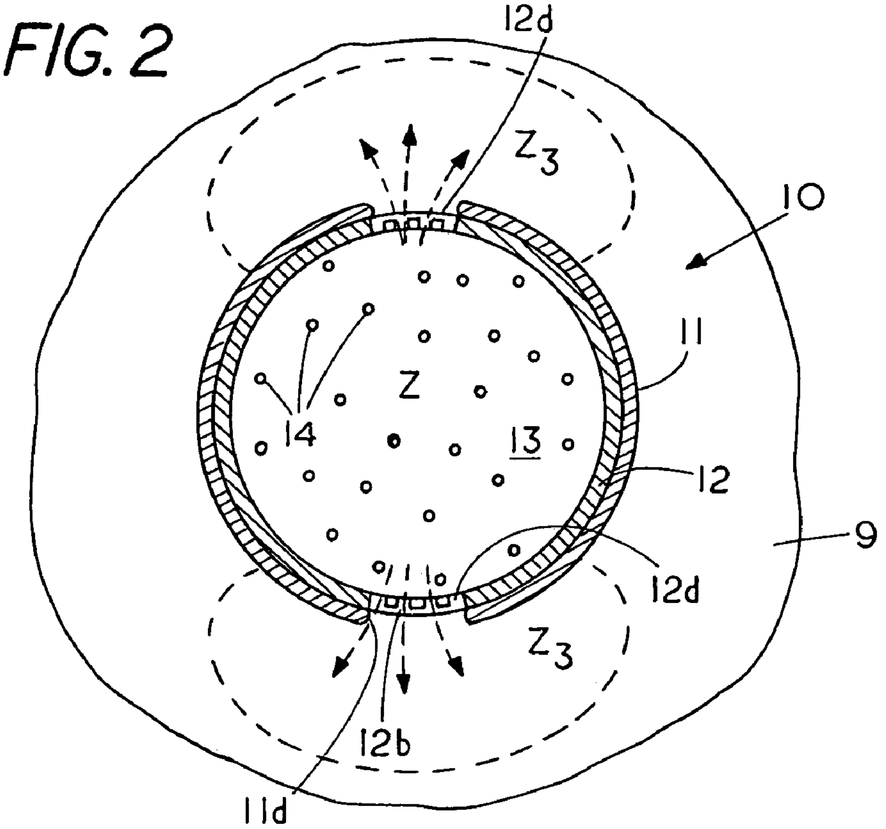
FIG. 2 is a cross section view taken along lines 2-2 of FIG. 1 with the universal cartridge positioned in a stagnant fluid environment.
Figure 3:
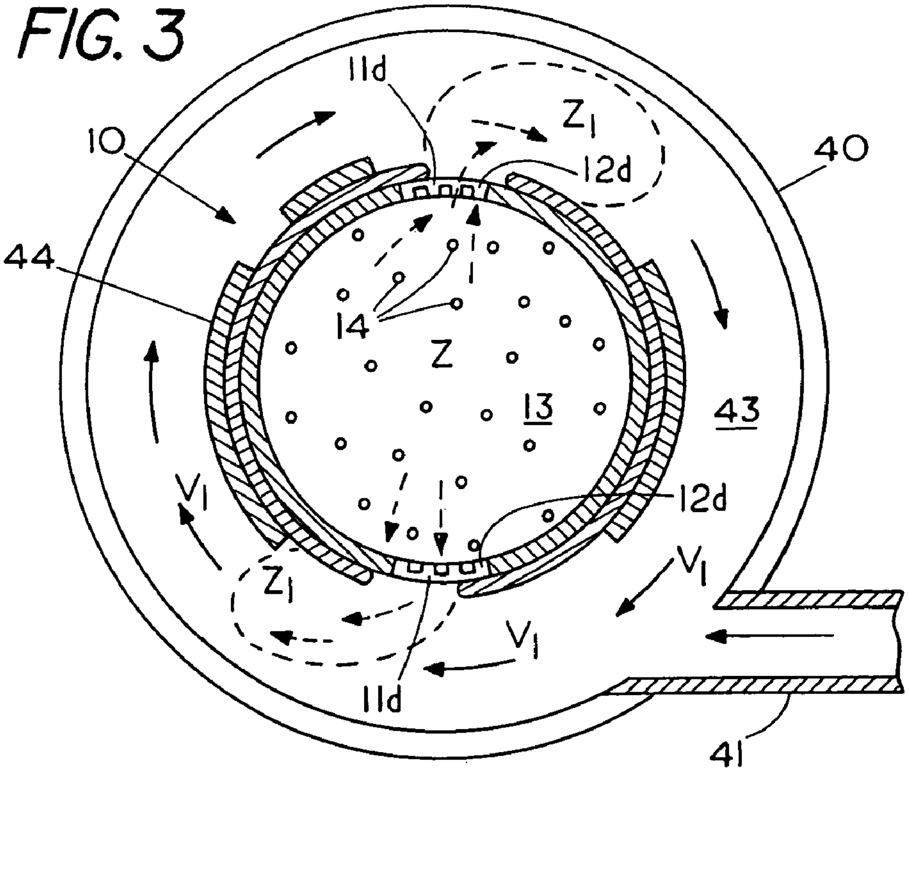
FIG. 3 is a cross section view of the cartridge located in a cartridge holder positioned within a fluid containment chamber in a moving fluid environment.

In order to illustrate the operation of the universal cartridge 10 in the presence of a moving fluid reference should be made to FIG. 3 which shows a cylindrical housing 40 having a tangential inlet 41 for directing fluid into the annular chamber 43 located between housing 40 and the universal cartridge 10. The universal cartridge shown in FIG. 3 is identical to the universal cartridge shown in FIG. 2 except that a cartridge career 44 is shown holding the universal dispenser in a concentric position within cylindrical housing 40. An exit port (not shown) is located below the universal cartridge 10 to allow the fluid therein to be discharged.

In operation the fluid enters on port 41 and flows laterally around the periphery of dispenser 10 with the fluid flow indicated by the solid arrows and reference $V_1$. The interior of the dispenser 10 contains a zone $Z_0$ where the dispersant 14 is at the highest concentration. Located immediately exterior to the diffusion ports are the zones $Z_1$ which are slightly distorted by the moving fluid. The diffusion of dispersant from the zone $Z_0$ to the zones Z1 occurs substantially independent of the fluid motion since the fluid circulates laterally past the universal cartridge 10. Thus even though the fluid external to the dispenser may have perturbations or go from laminar to turbulent or vice versa one is able to maintain a dispersion rate substantially a function of the velocity of the fluid stream. That is, the diffusion ports 11*d* and 12*d* allow migration or diffusion of dispersant from one zone to another zone without the need for direct flow from the dispersant chamber 13 to the exterior of dispenser 10. As the dispersant in zone $Z_1$ is carried away by the moving fluid stream it reduces the dispersant concentration in zone $Z_1$ thus allowing the dispersant to diffuse at a rate dependent on the difference in dispersant concentrations between $Z_1$ and $Z_3$.

Figure 4:
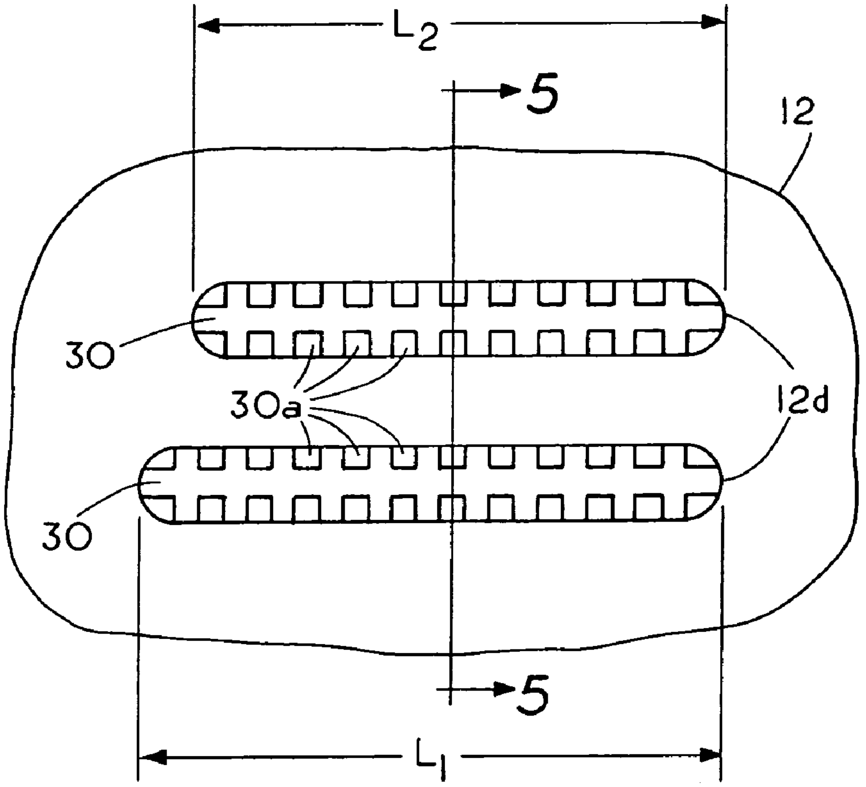
FIG. 4 is an enlarged view of a portion of the housing showing the diffusion port with a grid therein.

FIG. 4 is an enlarged view of a portion of housing 12 showing two of the recessed diffusion ports 12*d*. As can be seen the lower diffusion port has a length $L_1$ which is longer than the adjacent diffusion port which has a length $L_2$. The purpose of having diffusion ports of different lengths is to provide for one to adjust the transport area from within the housing by sealing off some of the diffusion ports. Each of the diffusion ports is shown with a grid 30 that extends laterally and transversely to the elongated diffusion ports 12*d*. The transport area comprises the open areas 30*a* in the grid 30. Thus any fluid flowing though diffusion port 12*d* faces frictional sidewall resistance due to the grid sidewalls that surround each of the open areas 30*a*.

Figure 5:
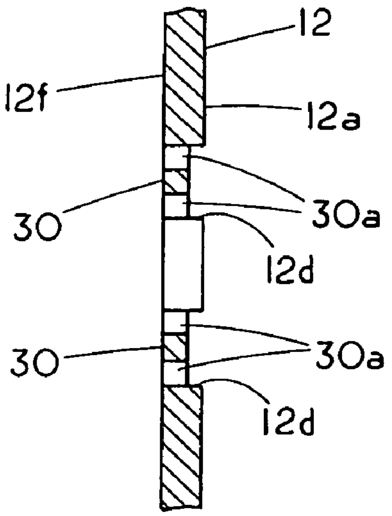
FIG. 5 is a cross section view taken along lines 5-5 of FIG. 4 to showing the recessed grid in the housing.

FIG. 5 is a sectional view taken along lines 5-5 of FIG. 4 and shows the elongated recessed diffusion ports 12*d* with the grid 30 therein. Each of the grids 30 are characterized by having a front face recessed from the mateable surface 12*a* and a back face substantially coplanar with the housing rear surface 12*f*. Thus the recessed diffusion ports 12*d* include multiple passages 30*a* that are not the full width of the elongated diffusion port 12*d*.

Figure 6:
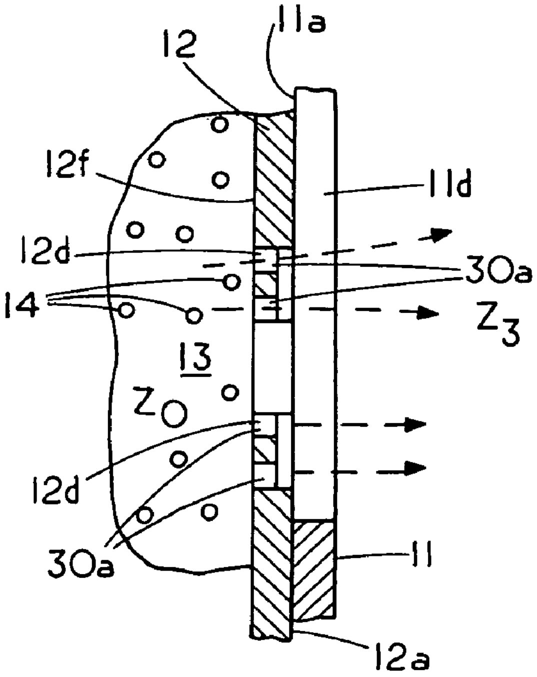
FIG. 6 shows a portion of the housing proximate a portion of the sleeve to show the transport area from the dispensing zone in the chamber in the housing to the receiving zone external to the chamber.

FIG. 6 shows the section view of FIG. 5 with a portion of the sleeve and the dispersant positioned proximate thereto to illustrate the diffusion path from the zone $Z_0$ to the exterior zone $Z_3$. The diffusion from zone $Z_0$ to Zone $Z_3$ must pass through the openings 30*a* and the opening 11*d* in sleeve 11. The dashed lines with arrows indicate the diffusion of the dispersant from the area of higher concentration $Z_0$ to the area of lower concentration $Z_3$ without the aid of any fluid transport. That is, with the present invention the separation of the interior of the housing from the exterior region of the sleeve 11 provides a transport area which has its minimum dimension at the interior surface 12*f* and its maximum dimension at the surface 11L. A feature of the present invention is that fluid motion between the interior of housing 12 and the exterior region of zone $Z_3$ is not necessary to dispense material. In fact, the arrangement of a grid like structure functions to provide resistance to fluid flowing therethrough by providing a large sidewall surface area that can introduce frictional resistance to fluid flow therethrough. That is, for a given flow area the amount of resistance to flow therethrough can be increased by increasing the sidewall area and hence the frictional resistance. Thus the universal cartridge includes a discouragement for direct flow therethrough but yet allows for diffusion of the dispersant therethrough which can occur independent of any fluid transfer.

Figure 7:
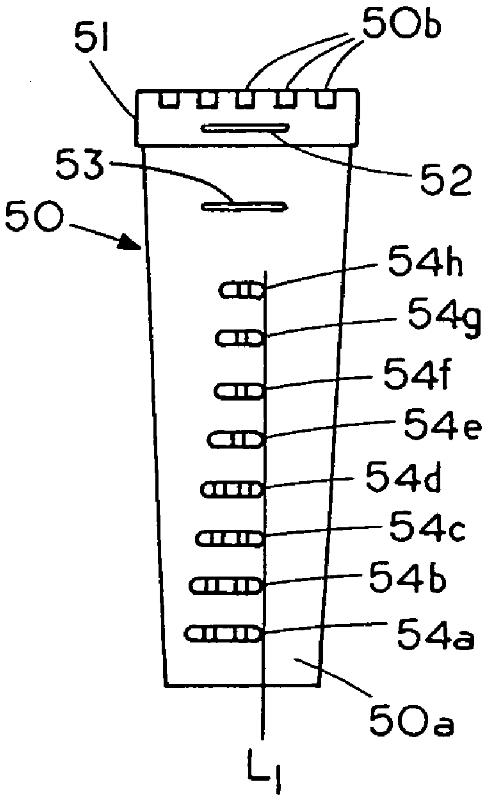
FIG. 7 is a front elevation view of the cartridge container of the cartridge dispenser.

FIG. 7 is a front elevation view of an alternate embodiment of the dispersant container 50 of a cartridge dispenser. Dispenser container 50 has a chamber therein that allows one to contain and hold the dispersant material in a dispersible condition therein. In the embodiments shown the open top cup-like dispersant container 50 comprises a tapered outer sidewall surface 50*a*, i.e. a frusto-conical shape. Sidewall surface 50*a* is sufficiently smooth so as to permit sliding engagement with an inner housing surface on the cartridge dispenser that has the same taper to it's surface. Located vertically along a longitudinal surface element of dispersant container 50 is a set of openings 54*a*, 54*b*, 54*c*, 54*d*, 54*e*, 54*f*, 54*g*, and 54*h* of equal height that gradually increase in length. In the embodiment shown each of the openings contain a grid and each are of different length but all are of the same width. The openings each have the right edge located along a vertical line $L_1$ that extends in an axial direction. The set of openings permit the dispersant in a dispersant chamber in dispersant container 50 to be dispersed through the set of opening therein. The top of dispersant container 50 includes an annular band 51 having raised ribs or gripping members 50*b* thereon that encompasses the peripheral region of the dispersant container 50 to provide a grasping region for a user. Located on band 51 is an elongated slot 52 for forming mating engagement with a protrusion on one side of a float and similarly located on the oppose side of band 51 is a second elongated slot (not shown) for forming supporting engagement with a protrusion on the opposite side of the float.

In the present invention the container 50 has a tapered outer surface that is identical to the taper of the inner surface of housing 11 which allows it to tightly mates with the inner tapered mating surface of housing 11. As a consequence one can form a leak resistant barrier between the housing 11 and an inner container 50. in addition, with the openings in alignment one can provide for a uniform and substantially linear increase of the dispersant into a liquid exterior to the dispenser whether the dispenser is used in a stagnant liquid environment or a moving fluid environment.

Figure 8:
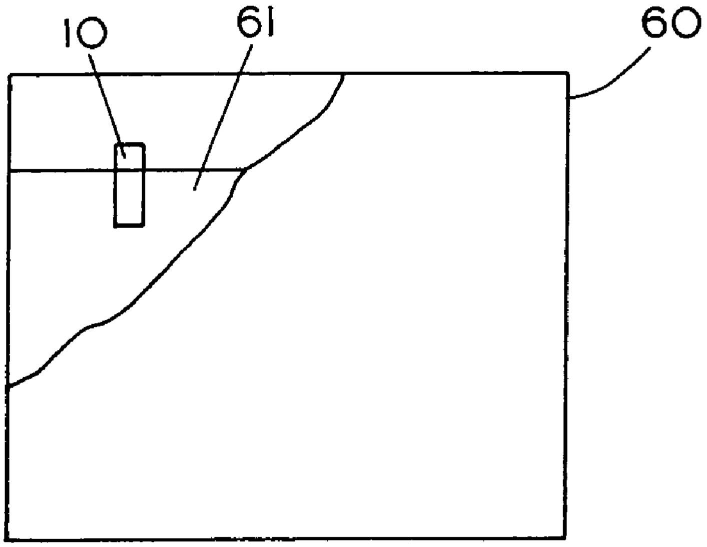
FIG. 8 is a partial cutaway view of a container containing a liquid in a stagnant environment.

FIG. 8 shows a container 60, such as hot tub or the like which contains a liquid 61 with the dispenser 10 floating in the liquid. In this embodiment the dispenser is dispensing material in a stagnant environment.

Thus, the invention includes a universal cartridge for controllable delivery of a dispersant in either a stagnant liquid or a moving liquid environment such as found in a hot tub, spa or swimming pool. The universal cartridge includes a housing 12 having a dispersant holding chamber 13 therein and a dispersant 14 which is dispersant located in said dispersant holding chamber 13. In operation the dispersant generates a first dispersant concentration in chamber 13 in the presence of a liquid such as water in dispersant holding chamber 13. A support member 15*b* on the universal cartridge for maintaining the universal cartridge 10 in a fixed condition proximate a moving liquid stream. A body of liquid 9 located outside chamber 13 with at least a portion of the body of liquid located within chamber 13 with the body of liquid 9 comprising a liquid for supporting transfer of a liquid treatment dispersant 14 from the dispersant holding chamber 13 to the body of liquid 9 located outside chamber 13. A float 15 on the universal cartridge for maintaining the universal cartridge 10 in a partially unsubmerged condition in the body of liquid. A set ports 12*d* extending through said housing to form a liquid passage to connect the liquid in the chamber 13 with the body of liquid 9 located outside the chamber to enable the dispersant 14 in the chamber 13 to be transferred into the body of liquid located outside the chamber to thereby increase the concentration of dispersant in the body of liquid outside the chamber whether the body of liquid outside of chamber is 13 stagnant body of liquid 9 in a moving liquid stream 9'.

We claim:

1. A universal cartridge for controllable delivery of a dispersant in either a stagnant liquid or a moving liquid environment comprising:

a housing having a dispersant holding chamber therein;

a dispersant, said dispersant located in said dispersant holding chamber, said dispersant generating a first dispersant concentration in said chamber in the presence of a liquid in said dispersant holding chamber;

a sleeve mateable with said housing;

a lip on said universal cartridge for maintaining the universal cartridge in a fixed condition proximate a moving liquid stream;

a body of liquid located outside said chamber with at least a portion of the body of liquid located within said chamber, said body of liquid comprising a liquid for supporting transfer of a liquid treatment dispersant from the dispersant holding chamber to the body of liquid located outside said chamber;

a float on said universal cartridge for maintaining the universal cartridge in a partially unsubmerged condition in the body of liquid; and a set ports extending through said housing to form a liquid passage to connect the liquid in the chamber with the body of liquid located outside to enable the dispersant in the chamber to be transferred into the body of liquid located outside the chamber to thereby increase the concentration of dispersant in the body of liquid outside the chamber whether the body of liquid outside of said chamber is a stagnant body of liquid or a moving liquid stream.

2. The universal cartridge of claim 1 wherein the body of liquid in the housing is water.

3. The universal cartridge of claim 2 wherein the universal cartridge is suspended in a hot tub.

4. The universal cartridge of claim 1 wherein said sleeve and said housing are frusto conical shaped.

5. The universal cartridge of claim 1 wherein said lip is integral.

* * * * *